US 10,118,458 B2

(12) United States Patent
Kim et al.

(10) Patent No.: US 10,118,458 B2
(45) Date of Patent: Nov. 6, 2018

(54) HEAT PUMP SYSTEM FOR VEHICLE

(71) Applicant: HYUNDAI MOTOR COMPANY, Seoul (KR)

(72) Inventors: Jae Yeon Kim, Gyeonggi-do (KR); Myunghwan Kim, Gyeonggi-do (KR); Wan Je Cho, Gyeonggi-do (KR); Yeon Ho Kim, Seoul (KR); Yong Hyun Choi, Gyeonggi-do (KR); Jai Young An, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 53 days.

(21) Appl. No.: 15/371,559

(22) Filed: Dec. 7, 2016

(65) Prior Publication Data

US 2018/0117986 A1    May 3, 2018

(30) Foreign Application Priority Data

Oct. 31, 2016    (KR) .................. 10-2016-0143465

(51) Int. Cl.
*B60H 1/00* (2006.01)
*H01M 10/663* (2014.01)
(Continued)

(52) U.S. Cl.
CPC ..... *B60H 1/00278* (2013.01); *B60H 1/00385* (2013.01); *B60H 1/00907* (2013.01);
(Continued)

(58) Field of Classification Search
CPC ............ B60H 1/00271; B60H 1/00278; B60H 1/00885; B60H 1/143; F25B 25/00; F25B 25/005; F25B 5/00; F25B 5/02
See application file for complete search history.

(56) References Cited

U.S. PATENT DOCUMENTS 6,357,541 B1    3/2002    Matsuda et al.
6,370,903 B1 *  4/2002    Wlech ................ B60H 1/00385
                                                      165/104.12
(Continued)

FOREIGN PATENT DOCUMENTS

JP    2002-352866 A    12/2002
JP    2010-114063 A    5/2010
(Continued)

*Primary Examiner* — Jianying Atkisson
*Assistant Examiner* — Antonio R Febles
(74) *Attorney, Agent, or Firm* — Knobbe Martens Olson & Bear LLP

(57) ABSTRACT

A heat pump system for a vehicle includes: a battery cooling line connected with a battery module, and water flowing through the battery cooling line; a chiller provided at the battery cooling line, connected with a coolant line of an air conditioner through a connection line, and configured to control the cooling water selectively introduced into the chiller by heat-exchanging the cooling water with coolant; a cooling part comprising a radiator and a first water pump connected with each other by a cooling line, configured to circulate the water through the cooling line to cool an electrical device, and connected with the battery cooling line through a first valve; and a bypass line configured to selectively connect the connection line with the coolant line through a second valve provided at the coolant line.

18 Claims, 7 Drawing Sheets

(51) Int. Cl.
  *B60H 1/22* (2006.01)
  *B60K 1/04* (2006.01)
  *H01M 10/625* (2014.01)
  *H01M 10/6568* (2014.01)
  *B60K 1/00* (2006.01)

(52) U.S. Cl.
  CPC ............... *B60H 1/22* (2013.01); *B60K 1/04* (2013.01); *H01M 10/625* (2015.04); *H01M 10/6568* (2015.04); *H01M 10/663* (2015.04); *B60K 2001/005* (2013.01); *H01M 2220/20* (2013.01)

(56) References Cited

U.S. PATENT DOCUMENTS

| | | | |
|---|---|---|---|
| 6,705,101 B2 | 3/2004 | Brotz et al. | |
| 7,147,071 B2 | 12/2006 | Gering et al. | |
| 7,797,954 B2 | 9/2010 | Duhme et al. | |
| 7,890,218 B2 | 2/2011 | Adams et al. | |
| 7,975,757 B2 | 7/2011 | Nemesh et al. | |
| 8,215,432 B2 | 7/2012 | Nemesh et al. | |
| 8,402,776 B2 | 3/2013 | Johnston et al. | |
| 9,222,710 B2 * | 12/2015 | Katayama | B60H 1/00921 |
| 9,579,951 B2 * | 2/2017 | Tschismar | B60H 1/00278 |
| 2013/0055747 A1 * | 3/2013 | Bach | B60H 1/321 62/238.6 |
| 2013/0074525 A1 | 3/2013 | Johnston et al. | |
| 2014/0033761 A1 | 2/2014 | Kawakami et al. | |
| 2014/0060102 A1 | 3/2014 | Nemesh et al. | |
| 2014/0216689 A1 | 8/2014 | Lombardo et al. | |

FOREIGN PATENT DOCUMENTS

| | | |
|---|---|---|
| JP | 5336033 B2 | 11/2013 |
| JP | 5440426 B2 | 3/2014 |
| JP | 2015-186989 A | 10/2015 |
| KR | 10-2015-0093590 A | 8/2015 |
| WO | 2012-013583 A1 | 2/2012 |

* cited by examiner

HEAT PUMP SYSTEM FOR VEHICLE

CROSS-REFERENCE TO RELATED APPLICATION

This application claims priority to and the benefit of Korean Patent Application No. 10-2016-0143465 filed in the Korean Intellectual Property Office on Oct. 31, 2016, the entire contents of which are incorporated herein by reference.

BACKGROUND

(a) Field

The present disclosure relates to a heat pump system for a vehicle.

(b) Description of the Related Art

In general, an air conditioner for a vehicle includes an air conditioner system for circulating coolant in order to heat or cool an inside of the vehicle.

Such air conditioner means may maintain comfortable indoor environment by maintaining an inside of the vehicle at a suitable temperature regardless of change in an external temperature. When coolant exhausted by driving a compressor passes through a condenser, a receiver dryer, an expansion valve, and an evaporator to be again circulated to the compressor, an inside of the vehicle is heated or cooled through heat exchange by the evaporator.

According to the air conditioner means, gaseous coolant with high temperature and high pressure compressed from the compressor is condensed through a condenser in a summer cooling mode and the condensed gaseous coolant reduces room temperature and humidity by evaporation in the evaporator through the receiver dryer and the expansion valve.

Meanwhile, in recent years, as there is gradually growing interest in energy efficiency and environmental pollution problems, there is a need to develop environmentally-friendly vehicles to substantially replace an internal combustion engine vehicle. The environmentally-friendly vehicles are divided into an electric vehicle operated by using a fuel cell or electricity as a power source, and a hybrid vehicle operated using an engine and a battery.

The disclosure of this section is to provide background of the invention. Applicant notes that this section may contain information available before this application. However, by providing this section, Applicant does not admit that any information contained in this section constitutes prior art.

SUMMARY

One aspect of the present invention provides a heat pump system for a vehicle having advantages of simplifying a system by increasing a temperature of a battery module or cooling the battery module using one chiller where coolant performs heat exchange with cooling water.

Another embodiment of the present invention provides a heat pump system for a vehicle capable of improving heating efficiency using waste heat sources of an electrical device and a battery module.

An example embodiment of the present invention provides a heat pump system for a vehicle including: a battery cooling line connected with a battery module, and water flowing through the battery cooling line; a chiller provided at the battery cooling line, connected with a coolant line of an air conditioner through a connection line, and configured to control the cooling water selectively introduced into the chiller by heat-exchanging the cooling water with coolant; a cooling part comprising a radiator and a first water pump connected with each other by a cooling line, configured to circulate the water through the cooling line to cool an electrical device, and connected with the battery cooling line through a first valve; and a bypass line configured to selectively connect the connection line with the coolant line through a second valve provided at the coolant line.

The air conditioner may include: an HVAC module comprising an opening/closing door connected with through the coolant line to control external air passed through an evaporator to be selectively introduced into an internal condenser according to a cooling mode, a heating mode, or a heating and dehumidification mode of the vehicle; a compressor connected with through the coolant line between the evaporator and the internal condenser; an accumulator provided between the compressor and the evaporator at the coolant line; an external condenser connected with the internal condenser through the coolant line, and disposed forward of the vehicle; a first expansion valve provided at the coolant line to connect the external condenser with the evaporator; a dehumidification line including one end connected with the coolant line between the internal condenser and the external condenser and another end connected with the coolant line between the evaporator and the first expansion valve, and comprising a third valve; a defrost line connected with the coolant line between the external condenser and the first expansion valve through a fourth valve provided at the coolant line between the internal condenser and the external condenser; and a second expansion valve provided at the connection line.

The second expansion valve may be operated when the water cools the battery module to expand the coolant introduced through the connection line to introduce the expanded coolant into the chiller.

The first valve may connect the battery cooling line with the cooling line connected with the electrical device between the radiator and the chiller, the battery cooling line may include a first branch line to connect the chiller with the battery module through the first valve, the cooling line may include a fifth valve to selectively connect the cooling line with the battery cooling line between the radiator and the battery module, and the cooling line for connecting the first valve with the electrical device may include a second branch line to connect the radiator with the electrical device through the fifth valve.

The first valve and the fifth valve may connect the cooling line with the battery cooling line during cooling the battery module using cooling water cooled from the radiator, and closes the first and second branch lines.

When increasing a temperature of the battery module, or cooling the battery module using the cooling water heat-exchanged with the coolant, the first valve may open the first branch line, and closes connection of the cooling line with the battery cooling line, and the fifth valve may close the second branch line, and closes connection of the cooling line with the battery cooling line.

When cooling the battery module in a cooling mode of the vehicle, the bypass line, the dehumidification line and the defrost line may be closed through operations of the second, third and fourth valves.

When cooling the battery module when the cooling mode of the vehicle is not operated, the bypass line, the dehumidification line, and the defrost line may be closed through operations of the second, third and fourth valves, and an operation of the first expansion valve stops, and the second expansion valve may be operated.

A reservoir tank may be provided between the radiator and the fifth valve in the cooling line, the reservoir tank may be connected with a third branch line through a sixth valve provided at a cooling line between the radiator and the electrical device, and may be connected with the first branch line through a degassing line.

When recovering waste heat of the battery module and waste heat of the electrical device in the heating mode of the vehicle, the battery cooling line may be connected with the cooling line through operations of the first valve and the fifth valve, and the first branch line and the second branch line are closed, the coolant line connected with the evaporator may be closed through an operation of the second valve, and the bypass line is open to be connected with the connection line, the dehumidification line and the defrost line may be closes through operations of the third valve and the fourth valve, when the cooling line for connecting the radiator is closed through an operation of the sixth valve, the third branch line may be open, and operations of the first and second expansion valves may stop.

When recovering waste heat of the battery module and waste heat of the electrical device in the heating and dehumidification mode of the vehicle, the battery cooling line may be connected with the cooling line through operations of the first valve and the fifth valve, and the first branch line and the second branch line may be closed, the coolant line connected with the evaporator may be closed through an operation of the second valve, and the bypass line may be open to be connected with the connection line, the dehumidification line may be open through an operation of the third valve, and the defrost line may be closed through an operation of the fourth valve, when the cooling line for connecting the radiator is closed through an operation of the sixth valve, the third branch line may be open, and operations of the first and second expansion valves may stop.

When recovering waste heat of the battery module and waste heat of the electrical device in the heating and defrost mode of the vehicle, the battery cooling line may be connected with the cooling line through operations of the first valve and the fifth valve, and the first branch line and the second branch line may be closed, the coolant line connected with the evaporator may be closed through an operation of the second valve, and the bypass line may be open to be connected with the connection line, the dehumidification line may be closed through an operation of the third valve, and the defrost line may be open through an operation of the fourth valve, the coolant line connected with the external condenser may be closed through an operation of the fourth valve, when the cooling line for connecting the radiator is closed through an operation of the sixth valve, the third branch line may be open, and operations of the first and second expansion valves may stop.

The degassing line may exhaust bubbles generated from the water passed through the first branch line to the reservoir tank or introduces bubbles collected from the water circulated through the cooling line to the first branch line in order to maintain pressure balancing of the cooling line and the battery cooling line.

The degassing line may partially introduce the bubbles included in the cooling water passed through the first branch line to the reservoir tank to prevent pressure difference generation between the cooling line and the first branch line when the cooling water heat-exchanged with the coolant cools the battery module in a state that the water is not circulated to the cooling line.

The first, second, fourth, fifth and sixth valves may include a 3-way valve which allows division of a fluid amount.

An orifice may be provided between the internal condenser and the fourth valve in the coolant line, and the orifice may select opens/closes the coolant line, or selectively expands passing coolant.

The dehumidification line may be connected with the coolant line the fourth valve and the orifice.

A second water pump may be provided between the chiller and the battery module in the battery cooling line.

A heater may be provided between the battery module and the chiller in the battery cooling line, the heater may be operated when increasing a temperature of the battery module to heat cooling water circulating through the battery cooling line and to introduced the heated cooling water into the battery module, and the heater may be selectively operated in a heating mode or a heating and defrost mode to heat the cooling water circulating through the battery cooling line.

The electrical device may be serially disposed on the cooling line between the radiator and the first water pump.

As describe above, in the heat pump system for a vehicle according to an embodiment of the present invention, a system may be simplified by increasing a temperature of a battery module or cooling the battery module using one chiller where coolant performs heat exchange with cooling water.

Further, optimal performance of a battery module may be obtained by efficiently increasing a temperature of a battery module or cooling the battery module suitably for a mode of the vehicle, and the whole travel distance of the vehicle may be increased by efficiently managing the battery module.

Moreover, heating efficiency can be improved selectively using waste heat sources of an electrical device and a battery module.

In addition, a manufacturing cost and a weight may be reduced and space usability can be improved by simplifying an entire system.

DESCRIPTION OF SYMBOLS

Figure 1:
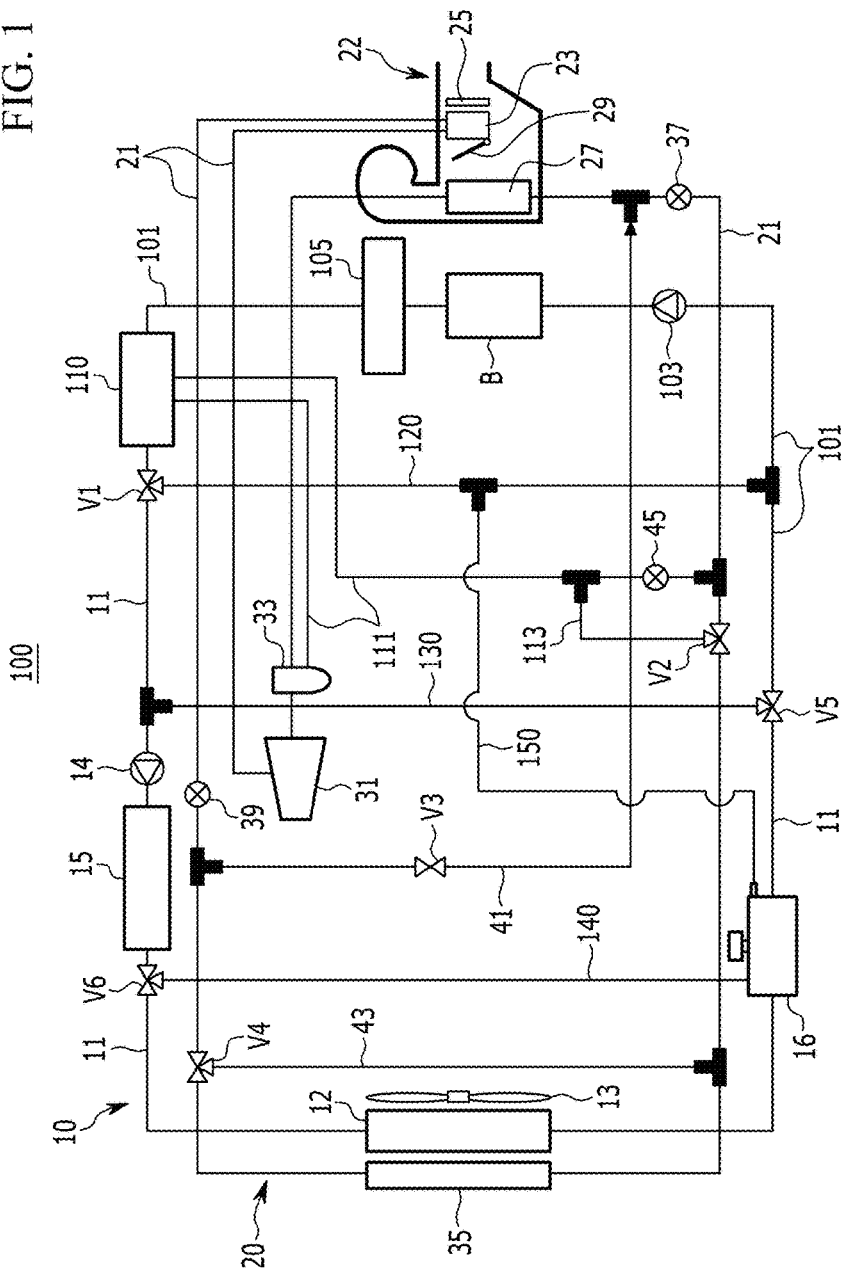
FIG. 1 is a block diagram illustrating a heat pump system for a vehicle according to an embodiment of the present invention.

10: cooling part
11: cooling line
12: radiator
13: cooling fan
14: first water pump
15: electrical device
16: reservoir tank
20: air conditioner
21: coolant line
22: HVAC module
23: internal condenser
25: internal heater
27: evaporator
29: opening/closing door
31: compressor
33: accumulator
35: external condenser
37: first expansion valve
39: orifice
41: dehumidification line
43: defrost line
45: second expansion valve
100: heat pump system
101: battery cooling line
103: second water pump
110: chiller
111: connection line
113: bypass line
120, 130, 140: first, second and third branch line
150: degassing line
B: battery module
V1, V2, V3, V4, V5, V6: first, second, third, fourth, fifth and sixth valve

DETAILED DESCRIPTION OF EMBODIMENTS

Hereinafter, an example embodiment of the present invention will be described in detail with reference to the accompanying drawings.

Although embodiments have been described with reference to a number of illustrative embodiments thereof, it should be understood that numerous other modifications and embodiments can be devised by those skilled in the art that will fall within the spirit and scope of the principles of this disclosure.

Accordingly, the drawings and description are to be regarded as illustrative in nature and not restrictive. Like reference numerals designate like elements throughout the specification.

Further, the size and thickness of each configuration shown in the drawings are optionally illustrated for better understanding and ease of description, the present invention is not limited to shown drawings and the thickness and size of each layer and each region may be exaggerated for the purpose of clarity.

In addition, unless explicitly described to the contrary, the word "comprise" and variations such as "comprises" or "comprising", will be understood to imply the inclusion of stated elements but not the exclusion of any other elements.

Further, the term " . . . unit", " . . . means", " . . . part", " . . . member" and the like used in the specification means a unit of a comprehensive configuration to perform at least one function or operation.

Among environmentally-friendly vehicles, the electric vehicle or the hybrid vehicle does not use a separate heater unlike an air conditioner of a general vehicle. An air conditioner applied to the environmentally-friendly vehicle generally refers to a heat pump system.

Meanwhile, the electric vehicle converts chemical reaction energy between oxygen and hydrogen into electrical energy to generate driving torque. During the above procedure, heat energy is generated by chemical reaction in a fuel cell. The generated heat is efficiently and essentially removed to ensure the performance of the fuel cell.

Further, since the hybrid vehicle generates the driving torque by operating a motor using electricity supplied from the fuel cell or an electric battery, the performance of the motor may be ensured by efficiently removing heat generated from the fuel cell, the electric battery, and the motor.

Accordingly, in typical hybrid vehicles or electric vehicles, a battery cooling system is configured together with cooling means and the heat pump system as a closed circuit in order to prevent heat generation of a battery including the motor, an electrical device, and the fuel cell.

Therefore, the size and weight of a cooling module disposed forward of the vehicle are increased. A layout of connection pipes for supplying coolant or cooling water from an inside of an engine compartment to the heat pump system, the cooling means, and a battery cooling system is complicated.

Further, the battery cooling system for warming up or cooling the battery according to a state of the vehicle is separately included so that the battery provides optimal performance. A plurality of valves for connecting the connection pipes with each other is applied. Noise and vibration due to frequent opening/closing operation of valves are transferred to an inside of the vehicle so that riding comfort is deteriorated.

FIG. 1 is a block diagram illustrating a heat pump system for a vehicle according to an embodiment of the present invention.

The heat pump system 100 for a vehicle according to an embodiment of the present invention may improve heating efficiency by increasing a temperature of a battery module or cooling a battery module B mounted in the vehicle or selectively using waste heat generated from the battery module B or an electrical device 15.

As shown in FIG. 1, the heat pump system 100 is operatively associated with a cooling part 10 configured to cool the electrical device 15 and an air conditioner configured to cool or heat an inside of the vehicle in a hybrid vehicle or an electric vehicle.

In this case, the cooling part 10 includes a radiator 12 and a first water pump 14 which are connected with each other by a cooling line 11, and circulate cooling water to cool the electrical device 15.

The electrical device 15 may include a motor, a power controller, and a charger.

The radiator 12 is disposed forward of the vehicle, and a cooling fan 13 is disposed rearward of the radiator 12, and the radiator 12 cools cooling water through an operation of the cooling fan 13 and heat exchange with external air.

In this case, the electrical device 15 may be serially connected on the cooling line 11 between the radiator 12 and the first water pump 14.

The cooling part 10 configured as above cools the electrical device 15 not to be excessively heated by circulating the cooling cooled from the radiator 12 through an operation of the first water pump 14.

The air conditioner 20 includes a heating, ventilation and air conditioning (HVAC) module 22, a compressor 31, an accumulator 33, an external condenser 35, and a first expansion valve 37 which are connected with each other through a coolant line 21.

First, the HVAC module 22 is connected with through the coolant line 21, and is provided therein with an opening/closing door 29 configured to control external air passed through the evaporator 27 to be selectively introduced into an internal condenser 23 and an internal heater 25 according to a cooling mode, a heating mode, and a heating/dehumidification mode.

In embodiments, the opening/closing door 29 is opened to introduce the external air passed through the evaporator 27 in the heating mode of the vehicle into the internal condenser 23 and the internal heater 25. To the contrary, the opening/closing door 29 closes an internal condenser 23 and an internal heater 25 side to directly introduce the external air cooled by passing through the evaporator 27 into an inside of the vehicle.

The compressor 31 is connected through the coolant line 21 between the evaporator 27 and the internal condenser 23. The compressor 31 compresses gaseous coolant.

The accumulator 33 is provided between the compressor 31 and the evaporator 27 in the coolant time 21. The accumulator 33 improves efficiency and durability of the compressor 31 by supplying only gaseous coolant to the compressor 31.

In the present embodiment, the external condenser 35 is connected with the internal condenser 27 through the coolant line 21. The external condenser 35 is disposed forward of the radiator 12 and performs heat exchange between internally introduced coolant and external air.

The first expansion valve 37 is provided at the coolant line 21 to connect the external condenser 35 with the evaporator 27. The first expansion valve 37 receives and expands the coolant passed through the external condenser 35.

In this case, the heat pump system 100 according to an embodiment of the present invention further include a battery cooling line 101, a chiller 110, and a bypass line 113.

First, the battery cooling line 101 is connected with the battery module B, and the cooling water flows through the battery cooling line 101. The battery module B supplies power to the electrical device 15. The battery module B may be cooled through the cooling water.

In embodiments, the battery module B is connected with the cooling part 10 through the battery cooling line 101, and the cooling water may circulate inside the battery module B by operating the second water pump 103.

The second water pump 103 is installed at the battery cooling line 101 between the chiller 110 and the battery module B. The second water pump 103 is operated to circulate the cooling water through the battery cooling line 101.

In this case, the first water pump 14 and the second water pump 103 may include an electric water pump.

The chiller 110 is provided at the battery cooling line 101, and is connected with the coolant line 21 through a connection line 111. The chiller 110 controls a temperature of the coolant by selectively performing heat, exchange between the cooling water introduced therein and the coolant.

Meanwhile, in the present embodiment, a heater 105 may be provided between the battery module B and the chiller 110 at the battery cooling line 101.

When temperature increase of the battery module B is required, the heater 105 is operated to introduce cooling water having increased temperature into the battery module B by heating the cooling water circulated from the battery cooling line 101.

Further, the heater 105 may be selectively operated in a heating mode or a heating/defrost mode of the vehicle to heat the cooling water circulated through the battery cooling line 101.

In this case, the cooling part 10 is selectively connected with the battery cooling line 101 through a first valve V1.

The first valve V1 may connect the battery cooling line 101 with the cooling line 11 connected with the electrical device 15 between the radiator 12 and the chiller 110.

The battery cooling line 101 may include a first branch line 120 to connect respective battery cooling lines 101 with each other between the chiller 110 and the battery module B through the first valve V1.

The first valve V1 selectively connects the cooling line 11 with the battery cooling line 101 or selectively connects the battery cooling line 101 with the first branch line 120 to control flow of the cooling water.

In embodiments, when the battery module B is cooled using the water cooled from the radiator 12, the first valve V1 may connect the battery cooling line 101 with the cooling line 11 connected with the radiator 12, or may close the first branch line 120.

Further, when increasing a temperature of the battery module B or cooling the battery module B using the cooling water heat-exchanged with the coolant, the first valve V1 may open the first branch line 120, and may close connection of the cooling line 11 with the battery cooling line 101.

Accordingly, cooling water at a low temperature heat-exchanged with the coolant in the chiller 110 may be introduced into the battery module B through the first branch line 120 which is opened by the first valve V1 to efficiently cool the battery module B.

Meanwhile, by preventing the cooling water circulated through the battery cooling line 101 from being introduced into the radiator 12 by an operation of the first valve V1 when a temperature of the battery module B is increased, the cooling water heated through an operation of the heater 105 may be introduced into the battery module 130 to rapidly increase a temperature of the battery module 130.

In the present embodiment, the bypass line 113 selectively connects the connection line 111 with the coolant line 21 through the second valve V2 provided at the coolant line 21.

Meanwhile, in the present embodiment, the air conditioner 20 further includes a dehumidification line 41, a defrost line 43, and a second expansion valve 45.

First, one end of the dehumidification line 41 is connected with the coolant line 21 between the internal condenser 23 and the external condenser 35. Another end of the dehumidification line 41 is connected with the coolant line 21 between the evaporator 27 and the first expansion valve 37. The dehumidification line 41 includes a third valve V3.

In embodiments, the dehumidification line 41 may be open by an operation of the third valve V3 in a heating and dehumidification mode of the vehicle.

The defrost line 43 is connected with the coolant line 21 between the external condenser 35 and the first expansion valve 37 provided at the coolant line 21 between the internal condenser 23 and the external condenser 35.

The defrost line 43 may be selectively open by an operation of the fourth valve V4 in the heating and defrost mode of the vehicle.

In this case, the coolant line 21 may include an orifice 39 between the internal condenser 23 and the fourth valve V4.

The orifice 39 expands the coolant exhausted from the internal condenser 23. Further, the orifice 39 may perform a function of a valve to selectively circulate the coolant without expansion of the coolant according to a cooling mode, a heating mode, and a heating/dehumidification mode.

In embodiments, the orifice 39 may selectively open/close the coolant line 21 or may selectively expand passing coolant.

In this case, the dehumidification line 41 may be connected with the coolant line 21 between the fourth valve V3 and the orifice 39.

Further, the second expansion valve 45 is provided at the connection line 111 between the external condenser 35 and the chiller 110.

When the water cools the battery module B, the second expansion valve 45 is operated. The second expansion valve 45 may expand coolant introduced through the connection line 111 to introduce the expanded coolant at a low temperature state to the chiller 110.

In embodiments, the second expansion valve 45 expands the condensed coolant exhausted from the external condenser 35 to introduce the coolant having a reduced temperature to the chiller 110, so that a temperature of the cooling water, passed through an inside of the chiller 110 may be further reduced.

Accordingly, the water having the reduced temperature passed through the chiller 110 is introduced into the battery module B so that the battery module B may be efficiently cooled.

In the present embodiment, the cooling line 11 includes a fifth valve V5 provided between the radiator 12 and the battery module B to selectively connect the battery cooling line 101 with the cooling line 11.

Moreover, the cooling line 11 may include a second branch line 130 to connect the radiator 12 with the electrical device 15 through an operation of the fifth valve V5 between the electrical device 15 and the chiller 110.

In this case, when the cooling water cooled from the radiator 12 cools the battery module B, the fifth valve V5 may close the second branch line 130.

Accordingly, the water cooled from the radiator 12 flows through the battery cooling line 101 connected with the cooling line 11 by an operation of the fifth valve V5 to cool the battery module B.

Meanwhile, when the water cools only the electrical device 15, the fifth valve V5 may close connection of the battery cooling line 101 with the cooling line 11, and may open the second branch line 130.

In embodiments, the water cooled from the radiator 12 is introduced into the electrical device 15 through the second branch line 130 to rapidly cool the electrical device 15.

Further, when the cooling water heat-exchanged with the coolant cools the battery module B or warms-up the battery module B and increases a temperature of the battery module B, the fifth valve V5 may open the second branch line 130, and may close connection of the battery cooling line 101 with the cooling line 11.

Meanwhile, the cooling line 11 may include a reservoir tank 16 between the radiator 12 and the fifth valve V5. The reservoir tank 16 may store the cooling water introduced from the radiator 12 where cooling is achieved.

The reservoir tank 16 is connected with the third branch line 140 through a sixth valve V6 which is provided in a cooling line 11 between the radiator 12 and the electrical device 15.

When waste heat of the battery module B and waste heat of the electrical device 15 is recovered in a heating mode of the vehicle, the third branch line 140 is open in a state that the cooling line 11 connected with the radiator 12 is closed by an operation of the sixth valve V6.

Further, the reservoir tank 16 may be connected with the first branch line 120 through a degassing line 150.

The degassing line 150 may exhaust bubbles generated from the water passed through the first branch line 120 to the reservoir tank 16 or introduce bubbles collected from the water circulated through the cooling line 11 to the first branch line 120 in order to maintain pressure balancing of the cooling line 11 and the battery cooling line 101.

Further, when the cooling water heat-exchanged with the coolant cools the battery module B in a state that the water is not circulated to the cooling line 11, the degassing line 150 may partially introduce the bubbles included in the cooling water passed through the first branch line 120 to the reservoir tank 16 to prevent pressure difference generation between the cooling line 11 and the first branch line 120.

Meanwhile, in the present embodiment, the reservoir tank 16 is provided between the radiator 12 and the battery module B at the cooling line 11. An embodiment has described that the degassing line 150 is connected with the first branch line 120. However, the present invention is limited thereto. The reservoir tank 16 may be provided between the radiator 12 and the battery module B at the battery cooling line 101. In this case, the degassing line 150 may be connected with the second branch line 130.

In the present embodiment, the first, second, fourth, fifth and sixth valves V1, V2, V4, V5, and V6 may include a 3-way valve which allows division of a fluid amount. Hereinafter, an operation by modes of the pump system 100 for the vehicle according to an embodiment of the present invention configured as above will be described in detail with reference to FIG. 2 to FIG. 7.

First, an operation state diagram during cooling a battery module using water in the heat pump system 100 for a vehicle according to an embodiment of the present invention is described with reference to FIG. 2.

Figure 2:
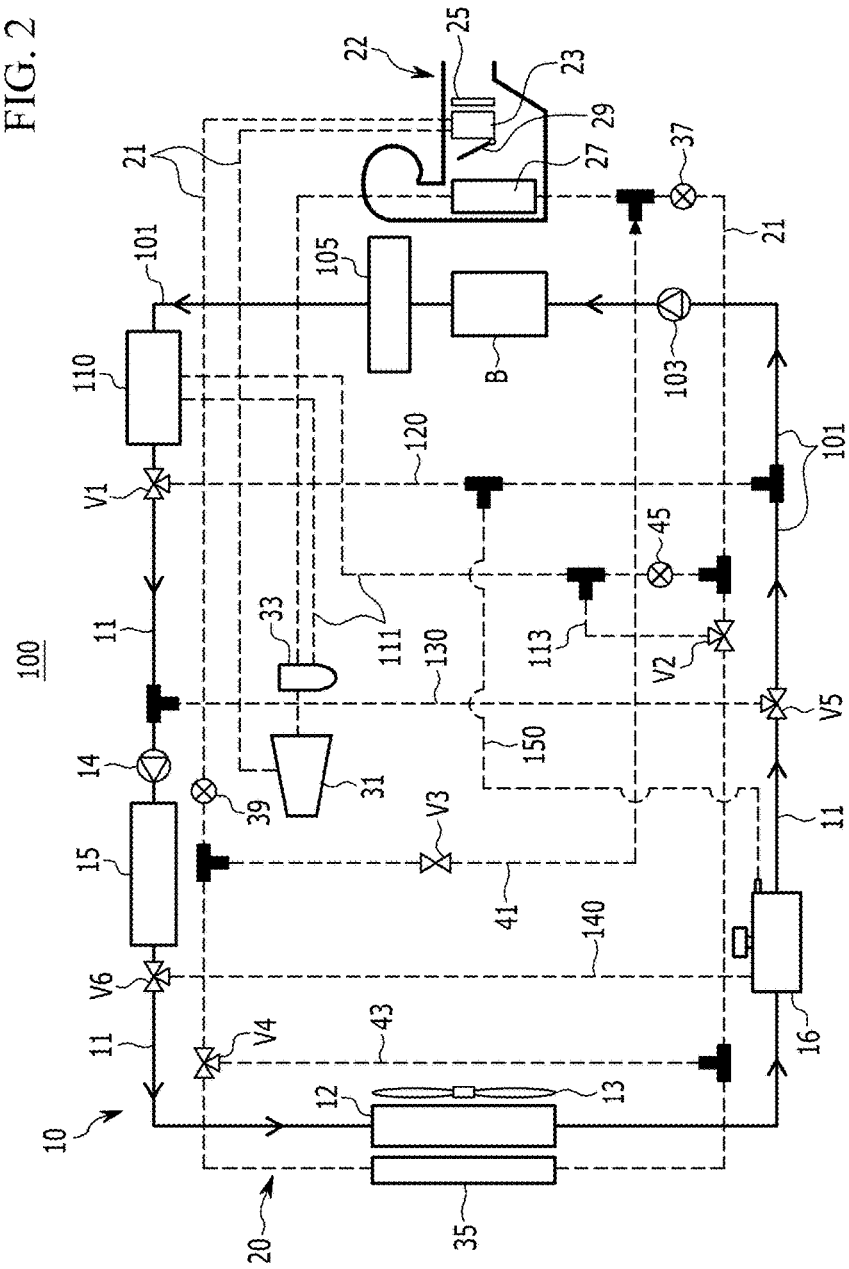
FIG. 2 is an operation state diagram during cooling a battery module using cooling water in the heat pump system for a vehicle according to an embodiment of the present invention.

FIG. 2 is an operation state diagram during cooling a battery module using cooling water in the heat pump system for a vehicle according to an embodiment of the present invention.

Referring to FIG. 2, the cooling part 10 is operated to cool the electrical device 15.

In this case, the first valve V1 connects the battery cooling line 101 with the cooling line 11 connected with the radiator 12, and closes the first branch line 120.

The fifth valve V5 closes the second branch line 130 while connecting the battery cooling line 101 with the cooling line 11. The sixth valve V6 opens the cooling line 11 to connect the radiator 12 with the electrical device 15, and closes the third branch line 140.

Accordingly, the battery cooling line 101 may be connected with the cooling line 11 by the first and fifth valves V1 and V5 to form one closed circuit in which the cooling water is circulated.

Accordingly, the cooling water cooled in the radiator 12 circulates through the cooling line 11 and the battery cooling line 101 to sequentially cool the battery module B and the electrical device 15 by operations of the first and second water pumps 14 and 103.

In embodiments, the cooling water exhausted from the radiator 12 is introduced into the battery module B through the battery cooling line 101 to cool the battery module B.

Next, the cooling water passes through the heater 105 and the chiller 110 which are turned-off and passes through the electrical device 15 through the cooling line 11 to be again introduced into the radiator 12.

In embodiments, the cooling water at a low temperature cooled from the radiator 12 firstly cools the battery module B to efficiently cool the battery module B.

Meanwhile, since a cooling mode of the vehicle is not operated, the air conditioner 20 is not operated.

An operation during cooling the battery module in the cooling mode of the vehicle is described with reference to FIG. 3.

Figure 3:
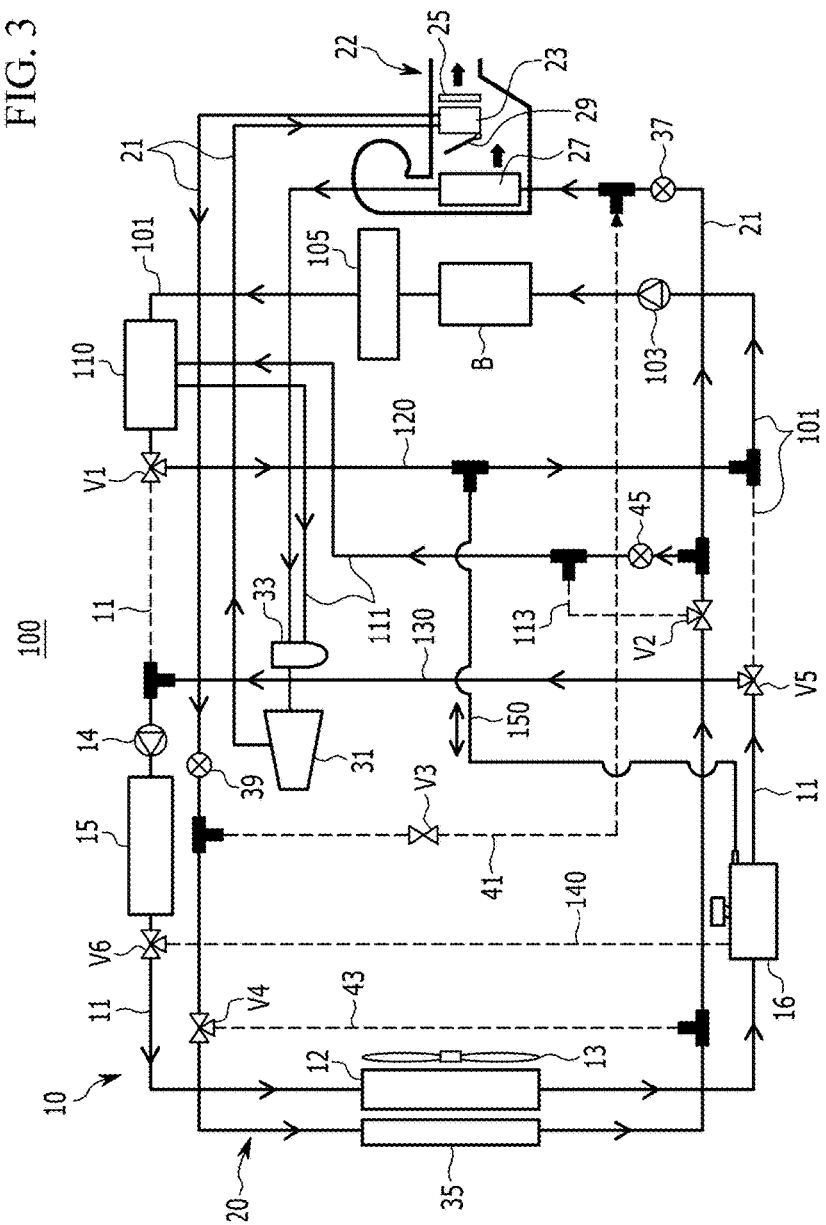
FIG. 3 is an operation state diagram during cooling an electrical device and a battery module in a cooling mode of the vehicle in the heat pump system for a vehicle according to an embodiment of the present invention.

FIG. 3 is an operation state diagram during cooling an electrical device and a battery module in a cooling mode of the vehicle in the heat pump system for a vehicle according to an embodiment of the present invention.

Referring to FIG. 3, the cooling part 10 is operated in order to cool the electrical device 15.

In this case, the first valve V1 opens the first branch line 120, and closes connection of the battery cooling line 101 with the cooling line 11. The fifth valve V5 closes connection of the cooling line 11 with the battery cooling line 101, and opens the second branch line 130.

Further, the sixth valve V6 closes the third branch line 140, and opens the cooling line 11 to connect the radiator 12 with the electrical device 15.

Accordingly, the cooling line 11 of the cooling part 10 and the battery cooling line 101 may form a closed circuit to independently circulate the cooling water through the first and second branch lines 120 and 130.

In embodiments, the cooling water heated from the radiator 12 circulates the cooling line 11 and the branch line 130 to cool the electrical device 15 through an operation of the first water pump 14.

Moreover, the cooling water passed through the chiller 110 circulates the battery cooling line 101 and the first branch line 120 to cool the battery module B through an operation of the second water pump 103.

The cooling water circulating the battery cooling line 101 is cooled through heat-exchange with the coolant in the chiller 110, and is supplied to the battery module B. Accordingly, the battery module B is cooled by the cooled cooling water.

In this case, the degassing line 150 may exhaust bubbles generated from the cooling water passed through the first branch line 120 to the reservoir tank 16 or introduce bubbles collected from the cooling water circulated through the cooling line 11 to the first branch line 120 in order to maintain pressure balancing of the cooling line 11 and the battery cooling line 101.

Meanwhile, the air conditioner 20 circulates the coolant along the coolant line 21 to cool an inside of the vehicle.

In this case, the bypass line 113, the dehumidification line 41 and the defrost line 43 are closed through operations of the second, third and fourth valves V2, V3, and V4.

Further, the connection line 111 is connected with the coolant line 21 by the second valve V2.

Accordingly, partial coolant exhausted from the external condenser 35 is expanded by an operation of the second expansion valve 45 to be in a low temperature and low pressure state, and is introduced into the chiller 110 connected with the connection line 111.

Next, the coolant introduced into the chiller 110 is heat-exchanged with the cooling water, and the heat-exchanged coolant is introduced into the accumulator 33 through the connection line 111.

In embodiments, the water having an increased temperature while cooling the battery module B is heat-exchanged with coolant at a low temperature and low pressure inside the chiller 110 to be cooled. The cooled water is again supplied to the battery module B through the battery cooling line 101.

In embodiments, the cooling water may efficiently cool the battery B by repeating the above operation.

Meanwhile, remaining coolant exhausted from the external condenser 35 flows through the coolant line 21 to cool the inside of the vehicle, and sequentially passes through the first expansion valve 37, the evaporator 27, the accumulator 33, the compressor 31, and the internal condenser.

In this case, external air introduced into the HVAC module 22 is cooled by passing through the evaporator 27 by the coolant at the low temperate state.

In this case, the opening closing door 29 closes a region passing through the internal condenser 23 so that the cooled external air does not pass through the internal condenser 23 and an internal heater 25. Accordingly, the cooled external air may be directly introduced into an inside of the vehicle to cool the inside of the vehicle.

Next, the coolant passes through the orifice 39 to be introduced into the external condenser 35, and passes through the external condenser 35 to be condensed through heat-exchange with the external air.

In this case, the orifice 39 may be operated as a valve.

In embodiments, as the above procedure is repeated, the coolant cools an inside in the cooling mode of the vehicle, and passes through the chiller 110 to cool the cooling water through heat exchange.

In the present embodiment, an operation is described with reference to FIG. 4 during cooling the battery module using the coolant in a state that a cooling mode of the vehicle stops.

Figure 4:
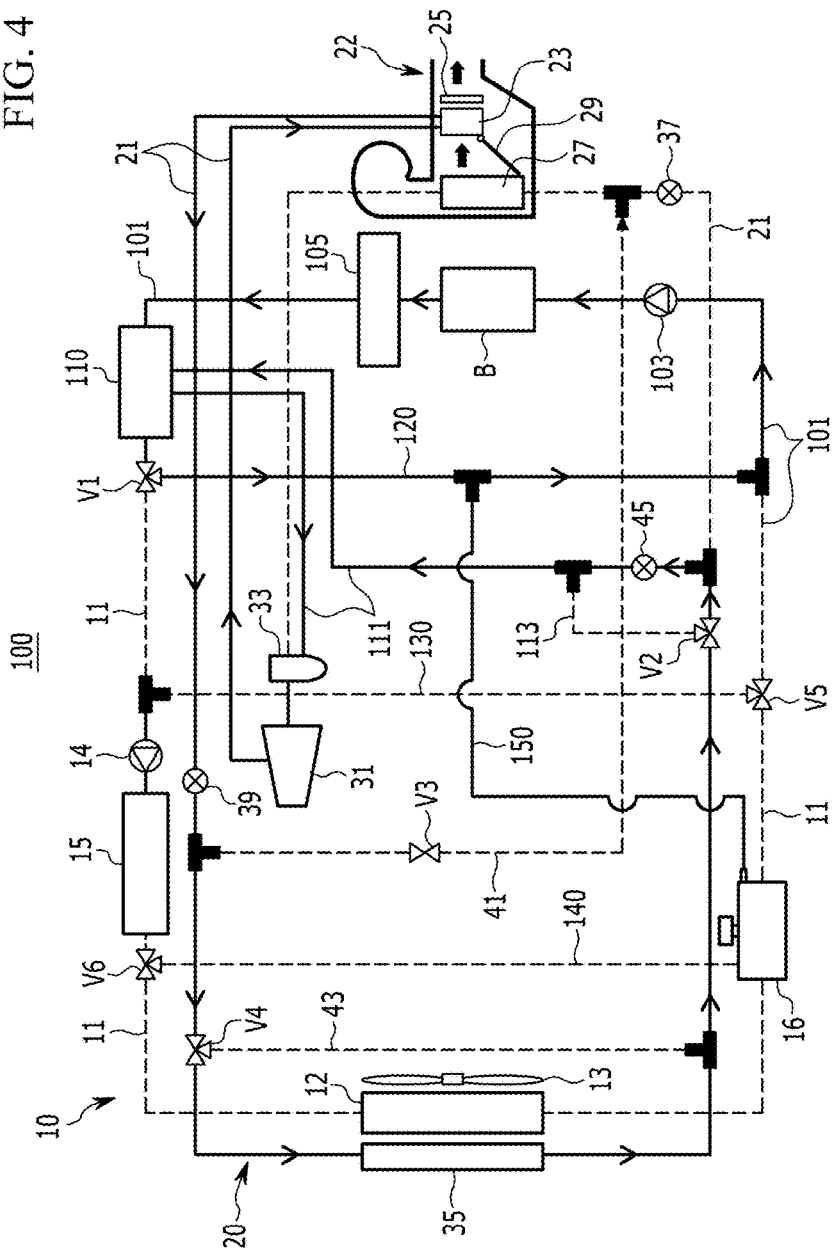
FIG. 4 is an operation state diagram during cooling a battery module using cooling water in the heat pump system for a vehicle according to an embodiment of the present invention when a cooling mode of the vehicle stops.

FIG. 4 is an operation state diagram during cooling a battery module using cooling water in the heat pump system for a vehicle according to an embodiment of the present invention when a cooling mode of the vehicle stops.

Referring to FIG. 4, when the cooling water cools the battery module B, a first expansion valve 37 of the air conditioner 20 stops to prevent the coolant from being introduced into the evaporator 27.

Accordingly, the coolant is introduced from the compressor 31 to the external condenser 35 to be condensed through heat-exchange with the external air. Next, the coolant is exhausted from the external condenser 35, and introduced into the connection line 111 connected with the coolant line 21 by the second valve V2.

The coolant introduced into the connection line 111 is expanded through an operation of the second expansion valve 45 to be in a low temperature and low pressure state, and passes through the chiller 110.

The coolant introduced into the chiller 110 is heat-exchanged with the cooling water, and the heat-exchanged coolant is introduced into the accumulator 33 through the connection line 111.

In this case, the first valve V1 may open the first branch line 120, and may close connection of the battery cooling line 101 with the cooling line 11.

Further, the fifth valve V5 may close connection of the second branch line 130 with the cooling line 11 and the battery cooling line 101.

In embodiments, the cooling water having an increased temperature by cooling the battery module B is heated-changed with the coolant at a low temperature and low pressure inside the chiller 110 to be cooled. The cooled cooling water is again supplied to the battery module B through the battery cooling line 101 and the first branch line 120.

Accordingly, the cooling water cooled through heat exchange with the coolant in the chiller 110 is introduced into the battery module 130 by an operation of the second water pump 103.

Accordingly, the cooling water may efficiently cool the battery B by repeating the above operation.

Meanwhile, when the cooling water heat-exchanged with the coolant cools the battery module B in a state that the cooling water is not circulated to the cooling line 11, the degassing line 150 may partially introduce the bubbles included in the cooling water passed through the first branch line 120 to the reservoir tank 16 to prevent pressure difference generation between the cooling line 11 and the first branch line 120.

Meanwhile, the coolant passed through the chiller 110 passes through the accumulator 33 and again sequentially passes through the compressor 31 and the internal condenser 23.

Next, the coolant passes through the orifice 39 to be introduced into the external condenser 35, and passes through the external condenser 35 to be condensed through heat exchange with external air.

In this case, the orifice 39 may be operated as a valve.

In this case, the bypass line 113, the dehumidification line 41, and the defrost line 43 are closed through operations of the second, third and fourth valves V2, V3, and V4.

Meanwhile, the cooling part 10 may be selectively operated according to a cooling demand of the electrical device 15. The present embodiment has described that the cooling part 10 is not operated by way of example.

However, if cooling of the electrical device 15 is required, the cooling line 11 and the second branch line 130 are open through operations of the fifth valve V5 and the sixth valve V6.

In this case, the cooling line 11 is not connected with the battery cooling line 101. Accordingly, the cooling water in the cooling part 10 and the battery module B independently flow through each closed circuit.

In embodiments, the cooling water cooled in the radiator 12 circulates the cooling line 11 to cool the electrical device 15 through an operation of the first water pump 14.

In contrast, the cooling water circulating the battery cooling line 101 is cooled in the chiller 110 through heat exchanged with the coolant, and the heat-exchanged cooling water is supplied to the battery module B. Accordingly, the battery module B is cooled by the cooling water cooled through the heat exchange with the coolant.

In embodiments, the cooling water cooled through the heat exchange with the coolant in the chiller 110 is introduced into the battery module B by an operation of the second water pump 103. Accordingly, the cooled cooling water may efficiently cool the battery module B.

An operation during recovering waste heat in the electrical device and the battery module in a heating mode of the vehicle will be described with reference to FIG. 5.

Figure 5:
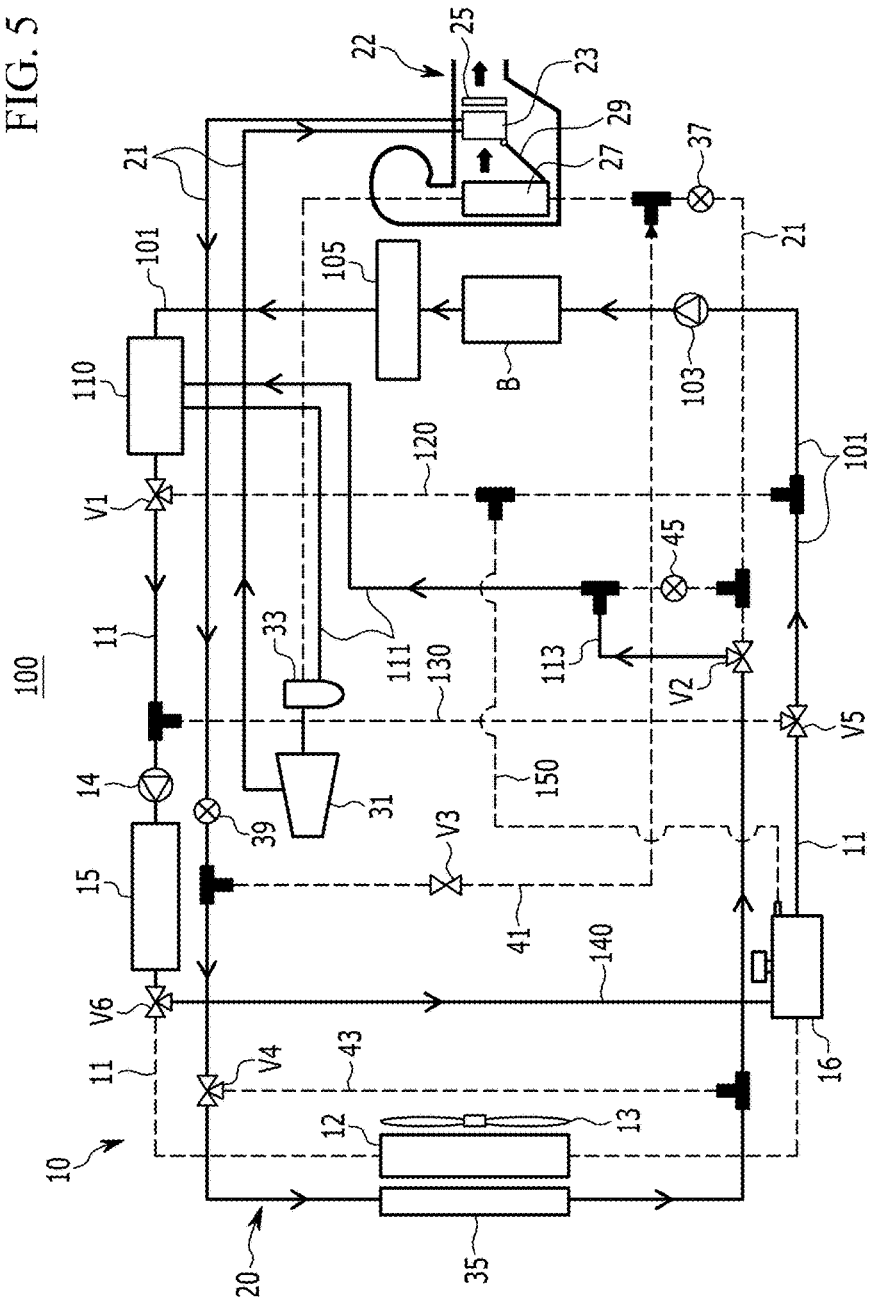
FIG. 5 is an operation state diagram during recovering waste heat in an electrical device and a battery module in a heating mode of the vehicle in the heat pump system for a vehicle according to an embodiment of the present invention.

FIG. 5 is an operation state diagram during recovering waste heat in an electrical device and a battery module in a heating mode of the vehicle in the heat pump system for a vehicle according to an embodiment of the present invention.

Referring to FIG. 5, when recovering waste heat of the battery module B and the electrical device 15 in the heating mode of the vehicle, the battery cooling line 101 is connected with the cooling line 11 through operations of the first and fifth valves V1 and V5, and the first and second branch lines 120 and 130 are closed.

The coolant line 21 connected with the evaporator 27 is closed through an operation of the second valve V2, and the bypass line 113 is open to be connected with the connection line 111.

In addition, the dehumidification line 41 and the defrost line 43 are closed by operations of the third and fourth valves V3 and V4.

In this case, the sixth valve V6 closes connection of the cooling line 11 so that the electrical device 15 is not connected with the radiator 12, and opens the third branch line 140.

Accordingly, the cooling water having an increased temperature due to waste heat generated from the electrical device and waste heat generated from the battery module B passes through the chiller 110 through operations of the first and second water pumps 14 and 103.

In this case, the first and second expansion valves 37 and 45 stop.

Accordingly, the coolant exhausted from the external condenser 35 is introduced into an open bypass line 113 through an operation of the second valve V2. Next, the coolant is introduced into the chiller 110 through the connection line 111, and is heat-exchanged with the cooling water having an increased temperature in the chiller 110.

In embodiments, the waste heat generated from the electrical device 15 and the waste heat generated from the battery module B increase the temperature of the cooling water in the chiller 110.

The cooling having the increased temperature passes through the accumulator 33 to be introduced into the compress, and is compressed into a high temperature and high pressure state from the compressor 31 to be introduced into the internal condenser 23.

In this case, the opening/closing door 29 is open so that the external air introduced into the HVAC module 22 and passing through the evaporator 27 may pass through the internal condenser 23.

Accordingly, when the external air introduced from an outside passes through the evaporator 27 to which the coolant is not supplied, the external air is introduced in a room temperature state which is not cooled. The introduced air passes through the internal condenser 23 to be converted into a high temperature state. The introduced air at the high temperature state passes through the internal heater 25 which is selectively operated to be introduced into an inside of the vehicle so that heating of the inside of the vehicle may be implemented.

Next, the coolant passes through the orifice 39 to be introduced into the external condenser 35 in an expanded state, and passes through the external condenser 35 to be condensed through heat exchange with the external air.

In this case, the orifice 39 may be operated as an expansion valve.

Meanwhile, the heater 105 may be selectively operated as necessary to heat the cooling water circulating the battery cooling line 101. Accordingly, a temperature the coolant passing through the chiller 110 is rapidly increased.

In embodiments, the heat pump system 100 according to the present embodiment may reduce power consumption of the compressor 31 and improve heating efficiency by using waste heat sources generated from the electrical device 15 and the battery module B in the heating mode of the vehicle in order to increase a temperature of the coolant.

An operation during recovering waste heat in the electrical device and the battery module according to a heating and dehumidification mode of the vehicle in the present embodiment will be described with reference to FIG. 6.

Figure 6:
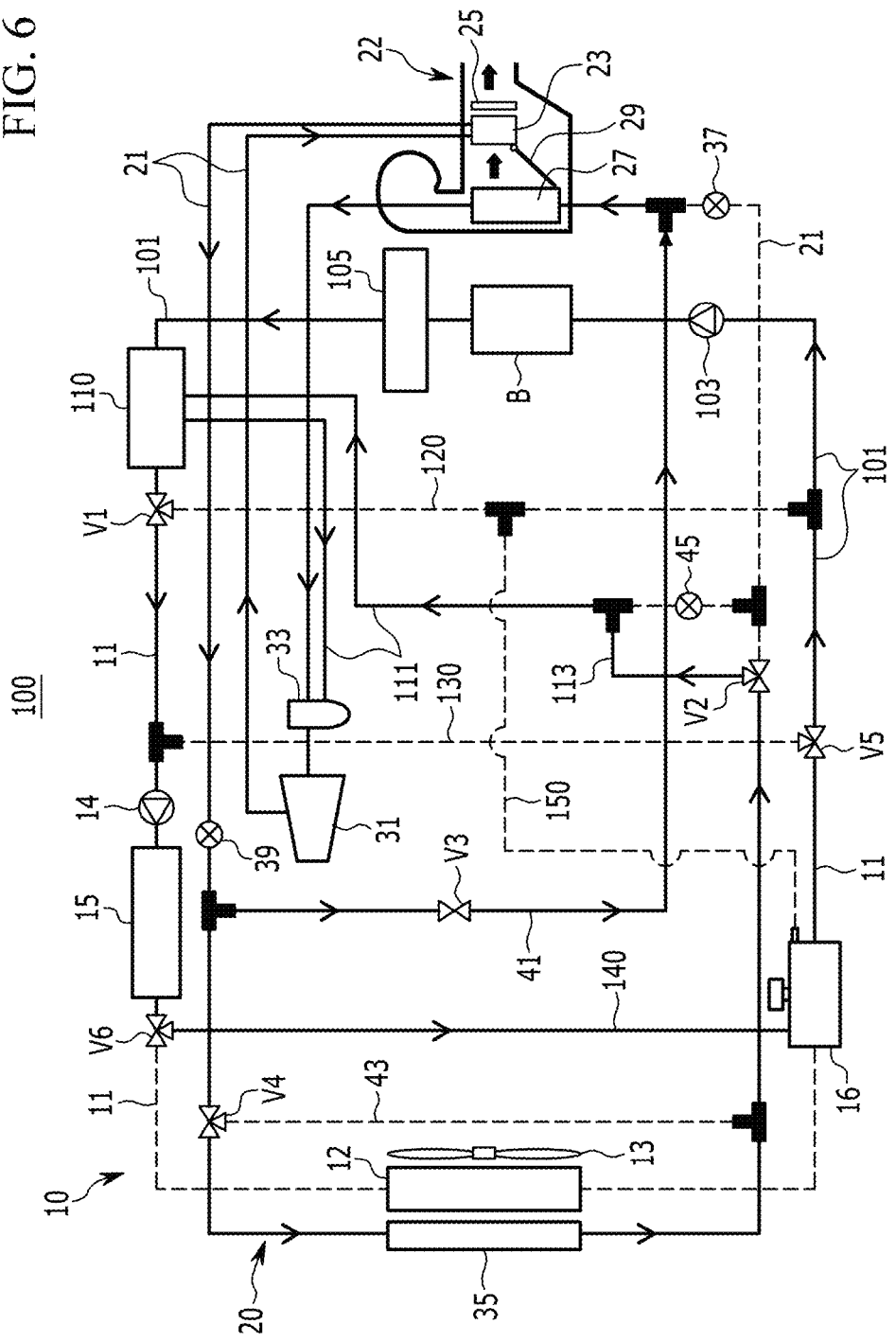
FIG. 6 is an operation state diagram during recovering waste heat in an electrical device and a battery module in a heating and dehumidification mode of the vehicle in the heat pump system for a vehicle according to an embodiment of the present invention.

FIG. 6 is an operation state diagram during recovering waste heat in an electrical device and a battery module in a heating and dehumidification mode of the vehicle in the heat pump system for a vehicle according to an embodiment of the present invention.

Referring to FIG. 6, when recovering the waste heat in an electrical device 15 and a battery module B in a heating and dehumidification mode of the vehicle, the battery cooling line 101 is connected with the cooling line 11 through operations of the first and fifth valves V1 and V5, and the first and second branch lines 120 and 130 are closed.

The coolant line 21 is connected with the evaporator 27 is closed through an operation of the second valve V2, and the bypass line 113 is open to be connected with the connection line 111.

In this case, the sixth valve V6 closes connection of the cooling line 11 not to connect the electrical device 15 with the radiator 12, and opens the third branch line 140.

Accordingly, the cooling water having an increased temperature due to waste heat generated from the electrical device and waste heat generated from the battery module B passes through the chiller 110 through operations of the first and second water pumps 14 and 103.

In this case, the dehumidification line 41 is open through an operation of the third valve V3 so that the coolant introduced into the external condenser 35 partially circulates.

Further, the defrost line 43 is closed through an operation of the fourth valve V4, and operations of the first and second expansion valve 37 and 45 stop.

Accordingly, the coolant exhausted from the external condenser 35 is introduced into the open bypass line 115 by an operation of the second valve V2. Next, the coolant is introduced into the chiller 110 through the connection line 111, and is heat-exchanged with the cooling water having an increased temperature in the chiller 110.

In embodiments, the waste heat generated from the electrical device 15 and the battery module B increases the temperature of the coolant in the chiller 110.

The coolant having the increased temperature passes through the accumulator 33 to be introduced into the compressor, and is compressed at a high pressure state by the compressor 31 to be introduced into the internal condenser 23.

Meanwhile, the coolant line 21 to connect the first expansion valve 37 with the evaporator 27 is closed through an operation of the second valve V2. However, the coolant expanded by passing through the orifice 39 is partially introduced into the evaporator 27 through the open dehumidification line 41.

In this state, the opening/closing door 29 is open so that external air introduced into the HVAC module 22 to pass through the evaporator 27 passes through the internal condenser 23.

In embodiments, the external air introduced into the HVAC module 22 passes through the evaporator 27 to be dehumidified due to the coolant in a low temperature state introduced into the evaporator 27. Next, the external air passes through the internal condenser 23 to be converted into a high temperature state, and passes through the internal heater 25 which is selectively operated to be introduced into an inside of the vehicle, so that the inside of the vehicle is heated/dehumidified.

Next, the coolant passes through the orifice 39 to be introduced into the external condenser 35 in an expanded state, and passes through the external condenser 35 to be condensed through heat exchange with the external air.

In this case, the orifice 39 may be operated as an expansion valve.

In embodiments, the heat pump system 100 according to the present embodiment may reduce power consumption of the compressor 31 and improve heating efficiency by using waste heat sources generated from the electrical device 15 and the battery module B in the heating and dehumidification mode of the vehicle in order to increase the temperature of the coolant.

Further, the coolant expanded by passing through the orifice 39 is partially introduced into the evaporator 27 through the dehumidification line 41 so that internal dehumidification may be performed without an operation of the first expansion valve 37.

An operation during recovering waste heat in an electrical device and a battery module in a heating and defrost mode according to an embodiment of the present invention will be described with reference to FIG. 7.

Figure 7:
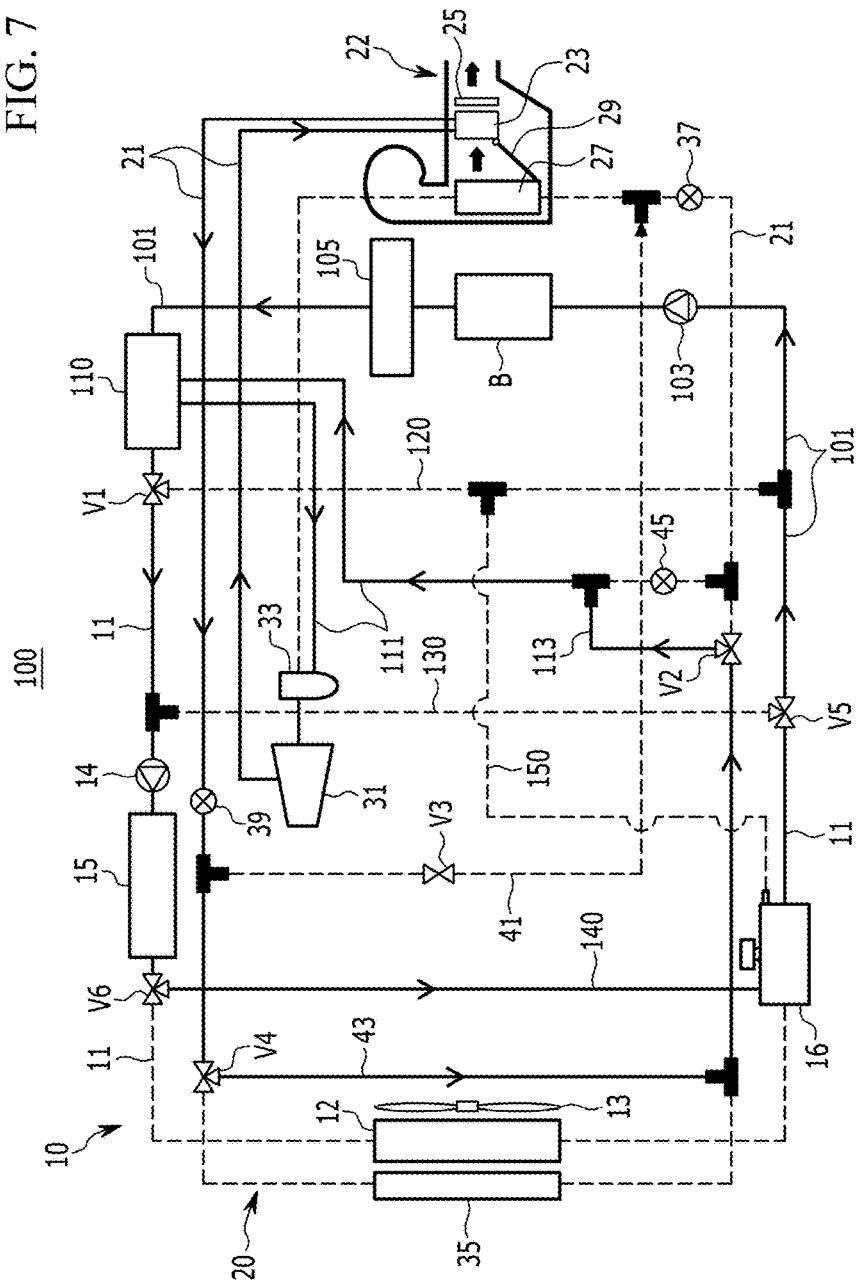
FIG. 7 is an operation state diagram during recovering waste heat in an electrical device and a battery module in a heating and defrost mode of the vehicle in the heat pump system for a vehicle according to an embodiment of the present invention.

FIG. 7 is an operation state diagram during recovering waste heat in an electrical device and a battery module in a heating and defrost mode of the vehicle in the heat pump system for a vehicle according to an embodiment of the present invention.

In this case, the defrost mode is operated when a frost is generated in the external condenser 35.

Referring to FIG. 7, when recovering the waste heat in an electrical device and a battery module in a heating and defrost mode of the vehicle, the battery cooling line 101 is connected with the cooling line 11 through operations of the first and fifth valves V1 and V5, and the first and second branch lines 120 and 130 are closed.

The coolant line 21 connected with the evaporator 27 is closed through an operation of the second valve V2, and the bypass line 113 is open to be connected with the connection line 111.

Further, the coolant line 21 connected with the external condenser 35 and the dehumidification line 41 is closed through operations of the third and fourth valves V3 and V4.

The defrost line 43 is open through an operation of the fourth valve V4.

In this case, the sixth valve V6 closes connection of the cooling line 11 so that the electrical device 15 is not connected with the radiator 12, and opens the third branch line 140.

Simultaneously, the battery cooling line 101 is connected with the cooling line 21 passing through the electrical device 15 through operations of the first, fifth and sixth valves V1, V5, and V6.

Accordingly, the cooling water having the increased temperature due to the waste heat generated from the electrical device 15 and the waste heat generated from the battery module B passes through the chiller 110 by operations of the first and second water pumps 14 and 103.

In this case, the defrost line 43 stops introduction of the coolant into the condenser 35 in which the frost is generated, and introduces the coolant into the chiller 110 through the bypass line 115 and the connection line 111, so that the defrost may be performed while preventing the frost, from being increased in the external condenser 35.

In this case, the operations of the first and second expansion valves 37 and 45 stop.

Accordingly, the coolant passing through the orifice 39 is introduced into the open bypass line 115 through an operation of the second valve V2 without passing through the external condenser 35. Next, the coolant is introduced into the chiller 110 through the connection line 111, and is heat-exchanged with the cooling water having an increased temperature in the chiller 110.

In embodiments, the waste heat generated from the electrical device 15 and the battery module B increases the temperature of the coolant in the chiller 110.

The coolant having the increased temperature passes through the accumulator 33 to be introduced into the compressor 31, and is compressed in a high temperature and high pressure state from the compressor 31 to be introduced into the internal condenser 23.

Meanwhile, the coolant line 21 to connect the first expansion valve 37 with the evaporator 27 is closed through an operation of the second valve V2.

In this state, the opening/closing door 29 is open so that the external air introduced into the HVAC module 22 to pass through the evaporator 27 passes through the internal condenser 23.

Accordingly, when introduced external air passes through the evaporator 27 to which the coolant is supplied to be introduced in a room temperature state which is not cooled. The introduced external air passes through the internal condenser 23 to be converted into a high temperature state, and passes through the internal heater 25 which is selectively operated to be introduced into an inside of the vehicle, so that the heating inside the vehicle may be implemented.

Next, the coolant passes through the orifice 39 to be expanded, and is again introduced into the defrost line 43 to be circulated.

In this case, the orifice 39 may be operated as an expansion valve.

Meanwhile, the heater 105 may be selectively operated as necessary to heat the cooling water circulating the battery cooling line 101. Accordingly, a temperature the coolant passing through the chiller 110 is rapidly increased.

In embodiments, the heat pump system 100 according to the present embodiment may reduce power consumption of the compressor 31 and improve heating efficiency by using a waste heat source generated from the electrical device 15 and the battery module B in the heating and defrost mode of the vehicle in order to increase a temperature of the coolant.

In addition, when a frost is generated in the external condenser 35, the external condenser 35 may be rapidly defrosted by blocking introduction of the coolant through the defrost line 43.

Meanwhile, an embodiment has described that both of the waste heat of the electrical device 15 and the waste heat of the battery module B are recovered in the heating mode of the vehicle. However, the present invention is limited thereto. The waste heat of the electrical device 15 or the waste heat of the battery module B is selectively recovered in the heating mode of the vehicle.

Further, in order to increase the temperature of the battery module B, the heater 105 is operated when the temperature of the battery module B is increased to heat the cooling water circulating the battery cooling line 101 to be introduced into the battery module B.

Accordingly, in the heat pump system 100 for a vehicle according to an embodiment of the present invention configured as above, a system may be simplified by increasing a temperature of a battery module B or cooling the battery module B using one chiller 110 where coolant performs heat exchange with cooling water.

Further, optimal performance of a battery module may be obtained by efficiently increasing a temperature of a battery module B or cooling the battery module B suitably for a mode of the vehicle, and the whole travel distance of the vehicle may be increased by efficiently managing the battery module B.

Moreover, heating efficiency can be improved selectively using waste heat sources of the motor 15, the electrical device 16 and the battery module B.

In addition, a manufacturing cost and a weight may be reduced and space usability can be improved by simplifying an entire system.

In embodiments, referring to FIGS. 1-7, a heat pump system for a hybrid vehicle includes a water circulation line 11 and a refrigerant circulation line 21. The water circulation line 11 circulates water for cooling one or more batteries B and one or more electric devices 15, e.g., an electric motor and/or an ECU, in the vehicle. The refrigerant circulation line 21 circulates a refrigerant or coolant for cooling or heating the interior of the vehicle.

In embodiments, the heat pump system further includes a chiller 110 connected to both the water circulation line 11 and the refrigerant circulation line 21 such that the water and the refrigerant exchange heat in the chiller 110. The refrigerant circulation line 21 includes a valve V2 and first and second branched portions for flowing at least part of the refrigerant toward the chiller 110. The first and second branched portions are disposed between the valve V2 and the chiller 110. The valve V2 controls the flow of the refrigerant such that the refrigerant flows through one of the first branched portion and the second branched portion and does not flow through the other. The second branched portion includes an expander or expansion valve 45 for expanding and cooling the refrigerant. The first branched portion does not comprise an expander or expansion valve.

In embodiments, when operating HAVC components in the refrigerant circulation line to heat or warm the interior of the vehicle, the valve V2 controls the flow of the refrigerant such that the refrigerant through the first branched portion 113 while the valve V2 does not allow the refrigerant to flow through the first branched portion 113 when cooling interior of the vehicle.

While embodiments of this invention have been described, it is to be understood that the invention is not limited to the disclosed embodiments, but, on the contrary, is intended to cover various modifications and equivalent arrangements included within the spirit and scope of the appended claims.

What is claimed is:

1. A heat pump system for a vehicle comprising:
    an air conditioner;
    a battery cooling line connected with a battery module, and water flowing through the battery cooling line;
    a chiller provided at the battery cooling line, connected with a coolant line of the air conditioner through a connection line, and configured to control the cooling water selectively introduced into the chiller by heat-exchanging the cooling water with a coolant;
    a cooling part comprising a radiator and a first water pump connected with each other by a cooling line, configured to circulate the water through the cooling line to cool an electrical device, and connected with the battery cooling line through a first valve; and a bypass line configured to selectively connect the connection line with the coolant line through a second valve provided at the coolant line, wherein the air conditioner comprises:
an HVAC module comprising an opening/closing door connected with through the coolant line to control external air passed through an evaporator to be selectively introduced into an internal condenser according to a cooling mode, a heating mode, or a heating and dehumidification mode of the vehicle,
a compressor connected with through the coolant line between the evaporator and the internal condenser,
an accumulator provided between the compressor and the evaporator at the coolant line,
an external condenser connected with the internal condenser through the coolant line, and disposed forward of the vehicle,
a first expansion valve provided at the coolant line to connect the external condenser with the evaporator,
a dehumidification line including one end connected with the coolant line between the internal condenser and the external condenser and another end connected with the coolant line between the evaporator and the first expansion valve, and comprising a third valve,
a defrost line connected with the coolant line between the external condenser and the first expansion valve through a fourth valve provided at the coolant line between the internal condenser and the external condenser, and
a second expansion valve provided at the connection line, wherein the first valve connects the battery cooling line with the cooling line connected with the electrical device between the radiator and the chiller, the battery cooling line comprises a first branch line to connect the chiller with the battery module through the first valve, the cooling line comprises a fifth valve to selectively connect the cooling line with the battery cooling line between the radiator and the battery module, and the cooling line for connecting the first valve with the electrical device comprises a second branch line to connect the radiator with the electrical device through the fifth valve.

2. The heat pump system for a vehicle of claim 1, wherein: the second expansion valve is operated when the water cools the battery module to expand the coolant introduced through the connection line to introduce the expanded coolant into the chiller.

3. The heat pump system for a vehicle of claim 1, wherein: the first valve and the fifth valve connect the cooling line with the battery cooling line during cooling the battery module using cooling water cooled from the radiator, and closes the first and second branch lines.

4. The heat pump system for a vehicle of claim 1, wherein: when increasing a temperature of the battery module, or cooling the battery module using the cooling water heat-exchanged with the coolant,
the first valve opens the first branch line, and closes connection of the cooling line with the battery cooling line, and
the fifth valve closes the second branch line, and closes connection of the cooling line with the battery cooling line.

5. The heat pump system for a vehicle of claim 1, wherein: when cooling the battery module in a cooling mode of the vehicle,
the bypass line, the dehumidification line and the defrost line are closed through operations of the second, third and fourth valves.

6. The heat pump system for a vehicle of claim 1, wherein: when cooling the battery module when the cooling mode of the vehicle is not operated,
the bypass line, the dehumidification line, and the defrost line are closed through operations of the second, third and fourth valves, and
an operation of the first expansion valve stops, and the second expansion valve is operated.

7. The heat pump system for a vehicle of claim 1, wherein: a reservoir tank is provided between the radiator and the fifth valve in the cooling line,
the reservoir tank is connected with a third branch line through a sixth valve provided at a cooling line between the radiator and the electrical device, and is connected with the first branch line through a degassing line.

8. The heat pump system for a vehicle of claim 7, wherein: when recovering waste heat of the battery module and waste heat of the electrical device in the heating mode of the vehicle,
the battery cooling line is connected with the cooling line through operations of the first valve and the fifth valve, and the first branch line and the second branch line are closed,
the coolant line connected with the evaporator is closed through an operation of the second valve, and the bypass line is open to be connected with the connection line,
the dehumidification line and the defrost line are closes through operations of the third valve and the fourth valve,
when the cooling line for connecting the radiator is closed through an operation of the sixth valve, the third branch line is open, and
operations of the first and second expansion valves stop.

9. The heat pump system for a vehicle of claim 7, wherein: when recovering waste heat of the battery module and waste heat of the electrical device in the heating and dehumidification mode of the vehicle,
the battery cooling line is connected with the cooling line through operations of the first valve and the fifth valve, and the first branch line and the second branch line are closed,
the coolant line connected with the evaporator is closed through an operation of the second valve, and the bypass line is open to be connected with the connection line,
the dehumidification line is open through an operation of the third valve, and the defrost line is closed through an operation of the fourth valve,
when the cooling line for connecting the radiator is closed through an operation of the sixth valve, the third branch line is open, and
operations of the first and second expansion valves stop.

10. The heat pump system for a vehicle of claim 7, wherein:
when recovering waste heat of the battery module and waste heat of the electrical device in the heating and defrost mode of the vehicle,
the battery cooling line is connected with the cooling line through operations of the first valve and the fifth valve, and the first branch line and the second branch line are closed, the coolant line connected with the evaporator is closed through an operation of the second valve, and the bypass line is open to be connected with the connection line, the dehumidification line is closed through an operation of the third valve, and the defrost line is open through an operation of the fourth valve, the coolant line connected with the external condenser is closed through an operation of the fourth valve, when the cooling line for connecting the radiator is closed through an operation of the sixth valve, the third branch line is open, and operations of the first and second expansion valves stop.

11. The heat pump system for a vehicle of claim 7, wherein: the degassing line exhausts bubbles generated from the water passed through the first branch line to the reservoir tank or introduces bubbles collected from the water circulated through the cooling line to the first branch line in order to maintain pressure balancing of the cooling line and the battery cooling line.

12. The heat pump system for a vehicle of claim 7, wherein: the degassing line partially introduces the bubbles included in the cooling water passed through the first branch line to the reservoir tank to prevent pressure difference generation between the cooling line and the first branch line when the cooling water heat-exchanged with the coolant cools the battery module in a state that the water is not circulated to the cooling line.

13. The heat pump system for a vehicle of claim 7, wherein:

the first, second, fourth, fifth and sixth valves comprise a 3-way valve which allows division of a fluid amount.

14. The heat pump system for a vehicle of claim 1, wherein:

an orifice is provided between the internal condenser and the fourth valve in the coolant line, and the orifice selects opens/closes the coolant line, or selectively expands passing coolant.

15. The heat pump system for a vehicle of claim 14, wherein: the dehumidification line is connected with the coolant line the fourth valve and the orifice.

16. The heat pump system for a vehicle of claim 1, wherein: a second water pump is provided between the chiller and the battery module in the battery cooling line.

17. The heat pump system for a vehicle of claim 1, wherein:

a heater is provided between the battery module and the chiller in the battery cooling line, the heater is operated when increasing a temperature of the battery module to heat cooling water circulating through the battery cooling line and to introduced the heated cooling water into the battery module, and the heater is selectively operated in a heating mode or a heating and defrost mode to heat the cooling water circulating through the battery cooling line.

18. The heat pump system for a vehicle of claim 1, wherein: the electrical device is serially disposed on the cooling line between the radiator and the first water pump.

* * * * *